Sept. 11, 1956  P. M. TAKESHITA  2,762,156
FISHING LURE
Filed July 20, 1954

INVENTOR.
PAUL M. TAKESHITA
BY
Salvatore G. Militano
ATTORNEY

United States Patent Office 2,762,156
Patented Sept. 11, 1956

2,762,156

FISHING LURE

Paul M. Takeshita, Miami, Fla.

Application July 20, 1954, Serial No. 444,475

1 Claim. (Cl. 43—42.23)

The present invention relates to fishing devices and is more particularly directed to fishing lures.

A principal object of the present invention is to provide an all purpose fishing lure which can be trolled deep in the water or close to the surface of the water as desired.

A further object of the present invention is to provide an all purpose fishing lure having deflector surfaces at either end thereof with a line securing eye bolt mounted on said surfaces to permit the fishing lure to be trolled by either end thereof.

A still further object of the present invention is to provide a fishing lure described hereinabove which is provided with a fishing gang hook mounted thereon in such a manner as to be properly positioned no matter by which end the fishing lure is being trolled.

The invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claim.

Figure 1:
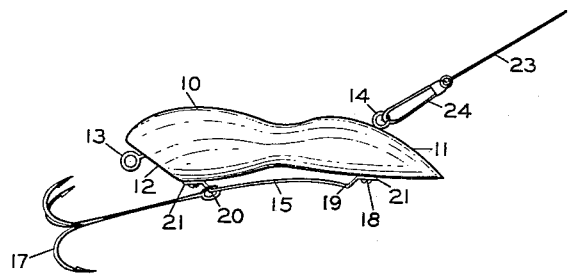
Figure 1 is a side elevational view of a fishing lure embodying my invention showing a fishing line secured to one end for deep water trolling.
Figure 2:
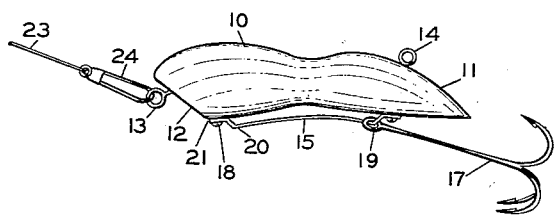
Figure 2 is a similar view connected for shallow water trolling.
Figure 3:
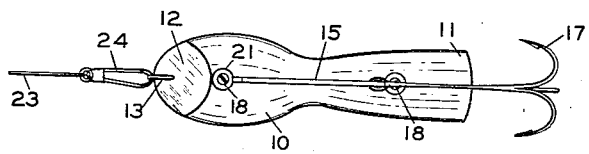
Figure 3 is a bottom plan view of the structure shown by Figure 2.

Referring to the drawing wherein like numerals are used to designate similar parts throughout the several views, the numeral 10 refers to a fishing plug or lure having the general configuration of an insect and the like that would normally tempt a fish into taking same while being trolled. The end portions of the fishing lure 10 are provided with a deflector surfaces 11 and 12, the deflector surface 11 facing upwardly, while deflector surface 12 faces downwardly. Adjacent the top of each of the deflector surfaces 11 and 12 there is an eyebolt 14 and 13 respectively threaded into the fishing plug 10. At the bottom surface of the fishing plug 10 there is a hanger bar 15 whose end portions 19 and 20 are bent at an angle thereto and extend in a direction toward the fishing plug 10, terminating in loops 21, 21, through which screws 18 extend for securing the hanger bar 15 in spaced relation to the fishing plug 10. A gang hook 17 is slidably mounted on the hanger bar 15 so that the hook 17 may take either of the positions shown by Figures 1 and 2. A fishing line 23 on the end of which a snap hook 24 is secured, engaging the eyebolt 14, is used for trolling or towing the fishing plug 10 as shown by Figure 1. Trolled in water at this position the forward motion of the plug 10 will cause the water to exert a force onto the deflector surface 11 compelling the forward portion of the fishing lure 10 to nose downwardly and thereby dive to deep water. On the other hand if the fishing line 23 is secured to the eye-bolt 13, the movement of the plug 10 in trolling will cause the water to exert an upward force on the deflector surface 12 thereby causing the fishing plug to tilt upwardly and climb toward the surface of the water. In either instance, as the fishing plug 10 is being trolled, the gang fishing hook 17 will slide along the hanger bar 15 to the rear thereof and assume its proper position for catching fish as shown by Figures 1 and 2. The fishing lure 10 when trolled at either end can be made to simulate the quick movements of an insect or fish or the gyrations of an injured insect or fish by merely giving the fishing line 23 a quick jerk and then releasing the line 23 until the fishing lure 10 resumes its previous trolling position.

Having described my invention, what I claim as new is:

A fishing lure comprising an elongated body member having a bottom portion and an inclined wall contained at each end of said elongated body member, one of said inclined walls facing upwardly and said other inclined wall facing downwardly, line attaching means secured on each of said inclined walls of said elongated body member, a slide bar having a main body portion and end portions off-set from said main body portion, means securing said end portions of said slide bar to said bottom portion adjacent said inclined walls of said elongated body member, said main body portion of said slide bar being in spaced relation to said bottom portion, and a fish hook slidably mounted on said slide bar and adapted to slide to either end of said elongated body member.

References Cited in the file of this patent

UNITED STATES PATENTS

| | | |
|---|---|---|
| 1,394,313 | Leeper | Oct. 18, 1921 |
| 1,472,638 | Dickman | Oct. 30, 1923 |
| 1,710,908 | Vereecken | Apr. 30, 1929 |
| 1,883,695 | Goerke | Oct. 18, 1932 |
| 2,159,591 | Leusch | May 23, 1939 |
| 2,360,563 | Harman | Oct. 17, 1944 |
| 2,517,925 | Pugh | Aug. 8, 1950 |
| 2,585,783 | Johnston | Feb. 12, 1952 |
| 2,684,551 | Hall | July 27, 1954 |
| 2,714,779 | Heiner | Aug. 9, 1955 |